United States Patent [19]

Tawse

[11] 4,211,945
[45] Jul. 8, 1980

[54] MULTI-VOLTAGE AND MULTI-FREQUENCY ALTERNATOR/GENERATOR OF MODULAR CONSTRUCTION

[75] Inventor: Ian S. Tawse, Weston, Canada

[73] Assignee: Gen-Tech, Inc., Cape Coral, Fla.

[21] Appl. No.: 843,936

[22] Filed: Oct. 20, 1977

[51] Int. Cl.² .......................................... H02K 21/10
[52] U.S. Cl. .................................. 310/112; 310/156; 310/1
[58] Field of Search ................. 310/112, 46, 268, 114, 310/126, 154, 156, 168

[56] References Cited

U.S. PATENT DOCUMENTS

| | | | |
|---|---|---|---|
| 2,006,172 | 6/1935 | Klappauf | 310/112 X |
| 2,864,964 | 12/1958 | Kober | 310/112 |
| 3,331,973 | 7/1967 | McClure | 310/46 |
| 3,396,296 | 8/1968 | Esters | 310/46 X |
| 3,418,506 | 12/1968 | Parker | 310/112 X |
| 3,452,229 | 6/1969 | Pimlott et al. | 310/168 |
| 3,471,728 | 10/1969 | Noble | 310/154 |
| 3,832,581 | 8/1974 | Hoffmann et al. | 310/268 X |

Primary Examiner—Donovan F. Duggan
Attorney, Agent, or Firm—Alan H. Levine

[57] ABSTRACT

An alternator/generator of modular construction in which a plurality of magnets are so arranged on the face(s) of a rotor(s) of disc or flywheel conformity as to interact with axially oriented and aligned pole pieces of magnetic material, in order to create a flux field across an air gap. A stator(s) cooperating with the rotor(s) comprises in part the pole pieces referred to in the foregoing, and about which are wound induction coils calculated to produce predictable quantities of electrical energy in a multiplicity of voltages and frequencies either simultaneously or otherwise.

6 Claims, 10 Drawing Figures

U.S. Patent  Jul. 8, 1980  Sheet 2 of 4  4,211,945
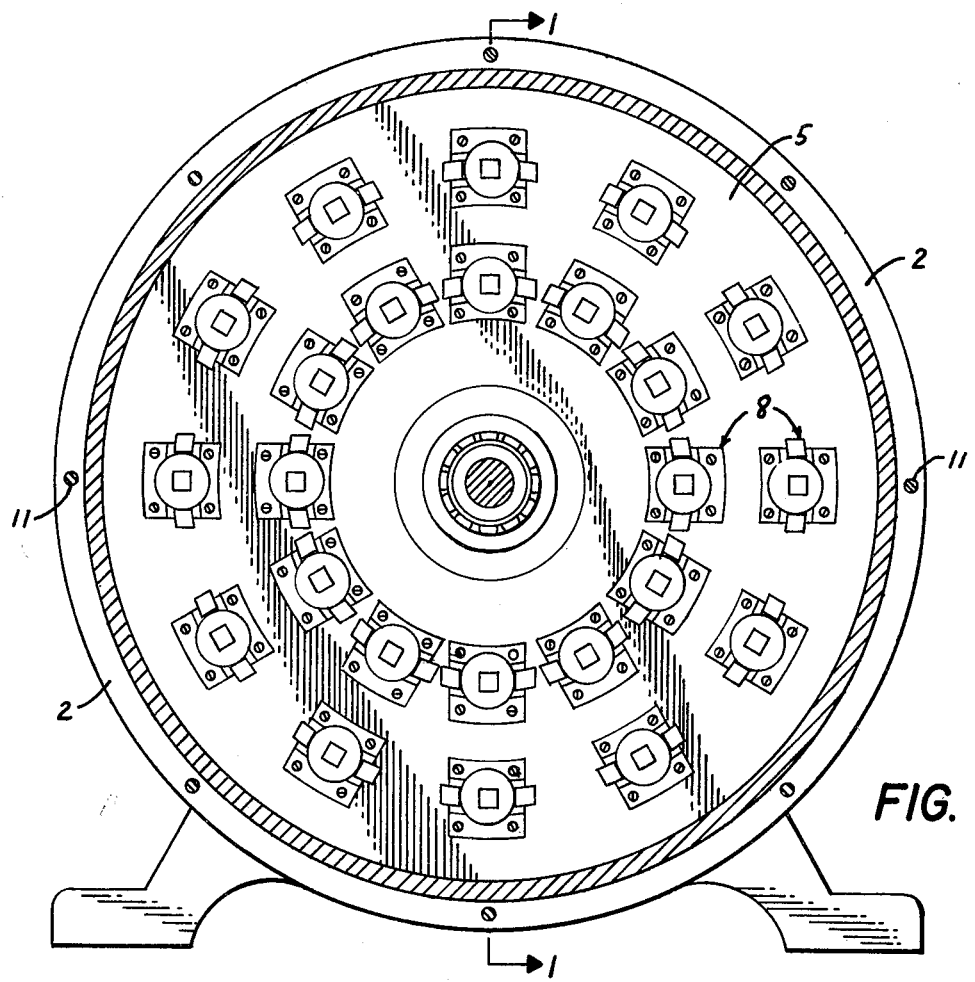
FIG. 2
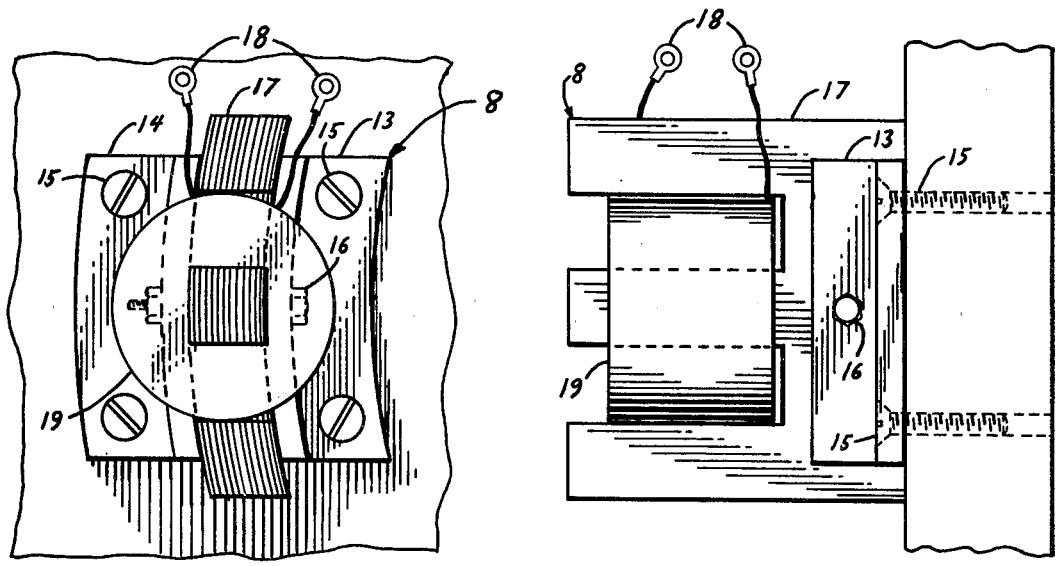
FIG. 3
FIG. 4

MULTI-VOLTAGE AND MULTI-FREQUENCY ALTERNATOR/GENERATOR OF MODULAR CONSTRUCTION

This invention relates generally to dynamo electric machines and in particular to the alternating current type with the magnetic field being produced either by permanent magnets, electromagnets, or a combination thereof.

An object of this invention is to provide an alternator/generator of modular construction wherein output capacities are increased simply by lineal or radial extension of standardized components.

A further object of this invention is to provide electrical energy in multiple voltages and multiple frequencies, and combinations thereof, either simultaneously or otherwise, from a single alternator/generator without resort to conversion or inversion equipment or apparatus.

It is also an object of this invention to provide an alternator/generator to produce pulsating direct current electricity, either from a complete unit or from a component of an alternator/generator, without recourse to output brushes, diodes or other means of inversion.

Another desireable feature of this invention is that its design concept lends itself to mass production methods whereby key components can be machine produced for simplified assembly, thereby lowering production costs and manufacturing time. To those experienced in the art, the following additional advantages would be self-evident:

Stator design ensures a maximum of active material in the magnetic circuit; only terminal leads are outside the influence of the magnetic field.

Stator design allows generous exposure of active material to ambient and provides extensive heat sink capability, thereby accelerating heat "carry-off" with resultant component life extension.

Modular construction concept allows for installation of intermediate shaft bearings, resulting in greater rotor stability.

Design concept allows for access and replacement of individual magnets, coils and bearings without disassembly of overall unit.

Design concept lends itself to low-speed operation when this characteristic is desireable or an otherwise important consideration.

The foregoing and other objects and features of this invention will be more easily understood by those skilled in the art from the following non-limiting, detailed description, when taken in connection with the accompanying drawings, in which:

FIG. 1 is a longitudinal sectional view showing the principal and significant features of the invention. In this figure, the magnetic field is indicated as being furnished by permanent magnets. For purposes of clarity, only representative permanent magnets, stator coils, and their assemblies are shown;

FIG. 2 is a view of a stator taken on line 2—2 of FIG. 1, showing one of the multitude of stator coil arrangements possible within the inventive concept;

FIG. 3 is a plan or face view of a stator coil assembly;

FIG. 4 is a side elevational view of a stator coil assembly showing the tooth-type pole pieces, coils with terminals, and retaining detail of the pole piece assembly;

Figure 1:
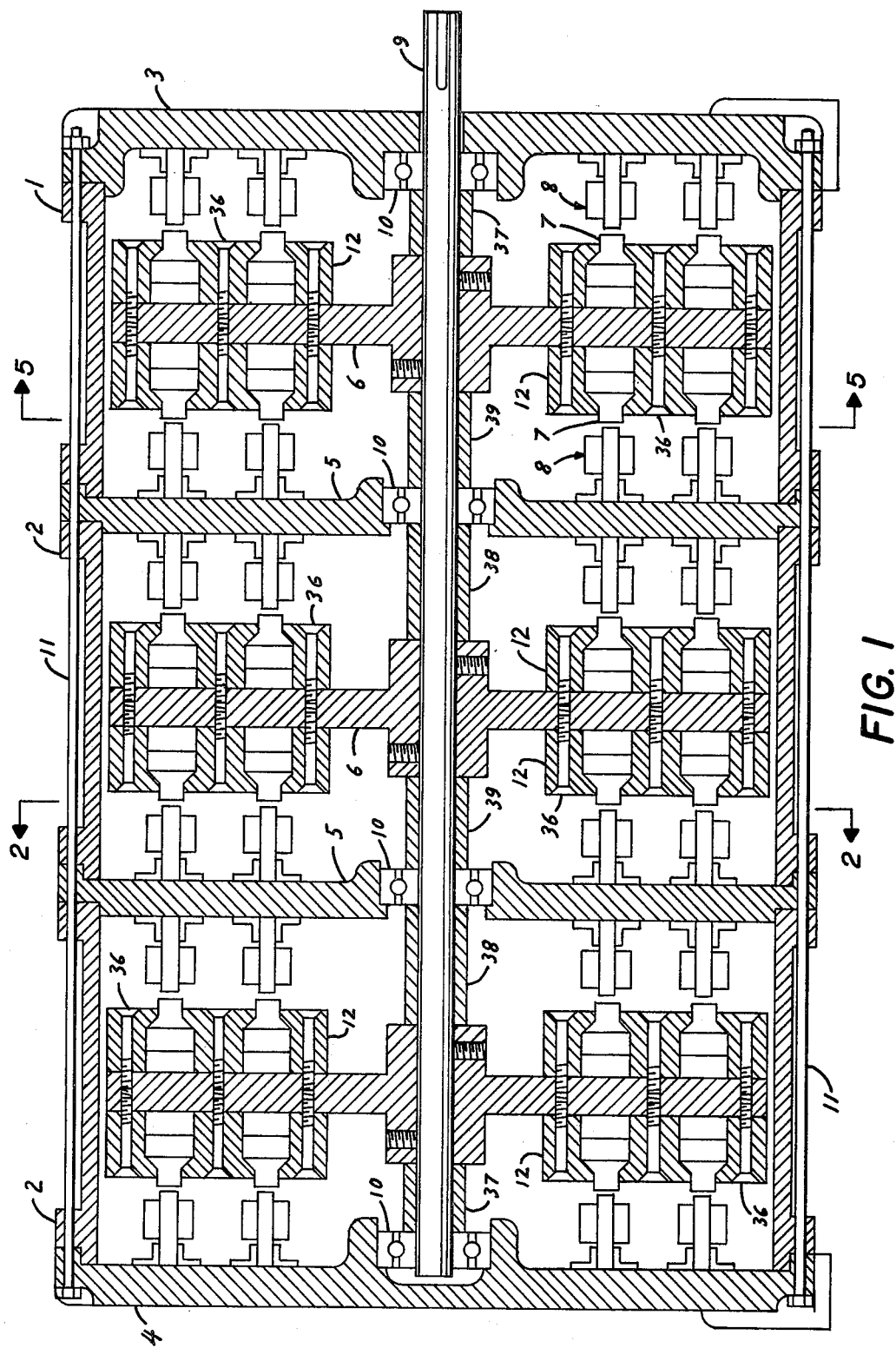
Figure 5:
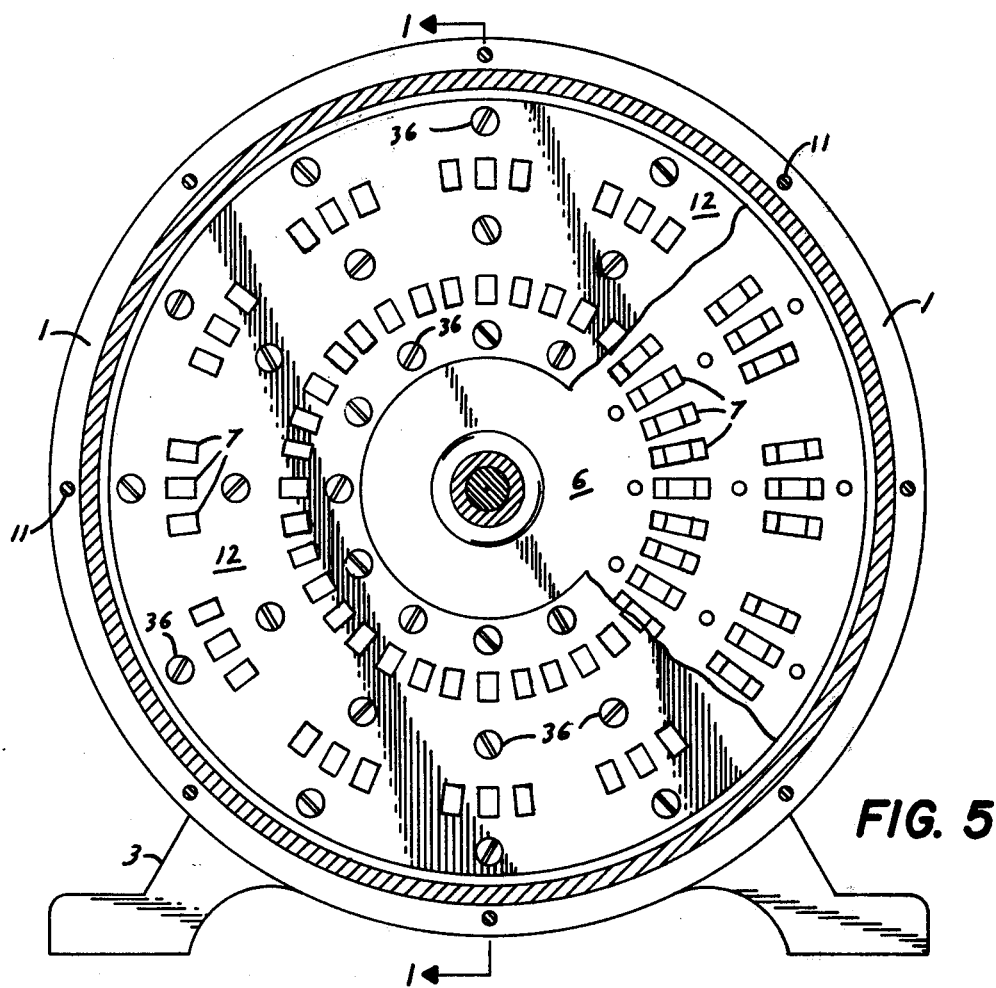
Figure 6:
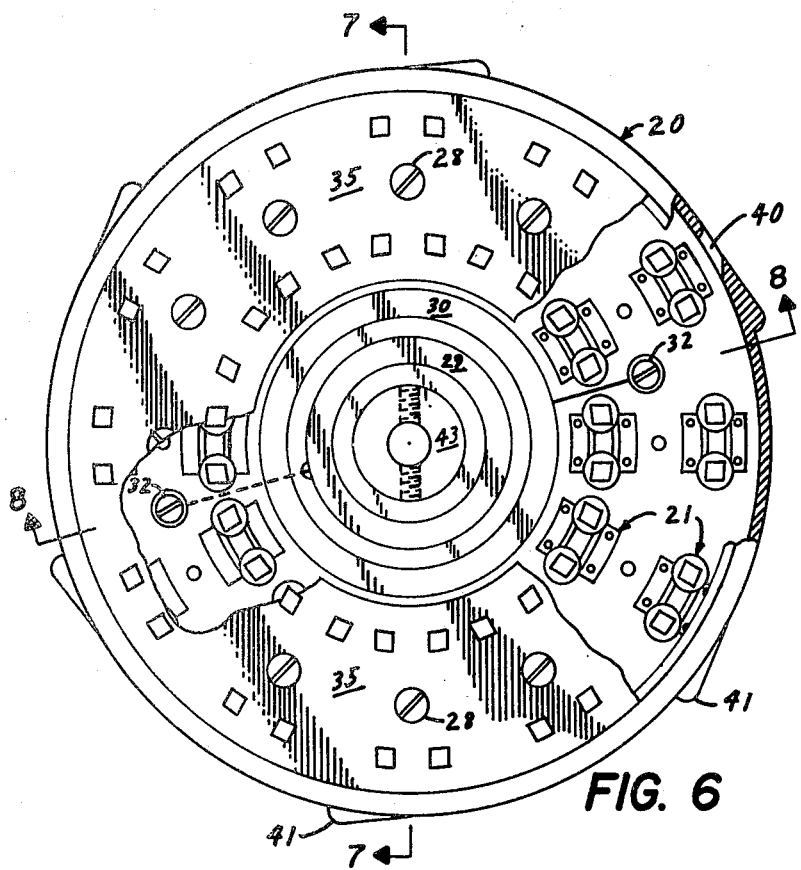
Figure 7:
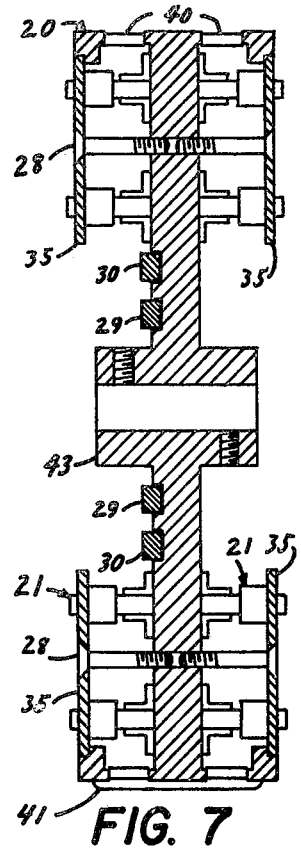
Figure 8:
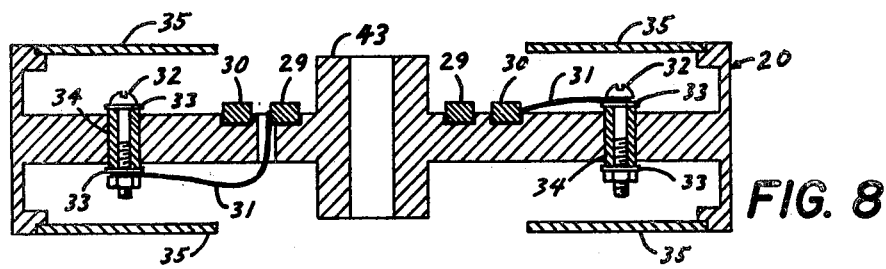
Figure 9:
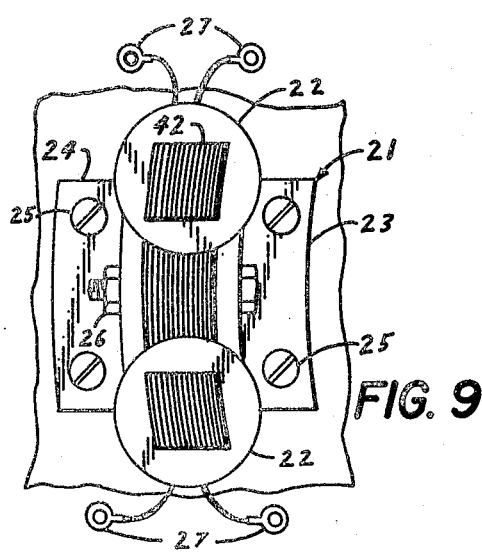
Figure 10:
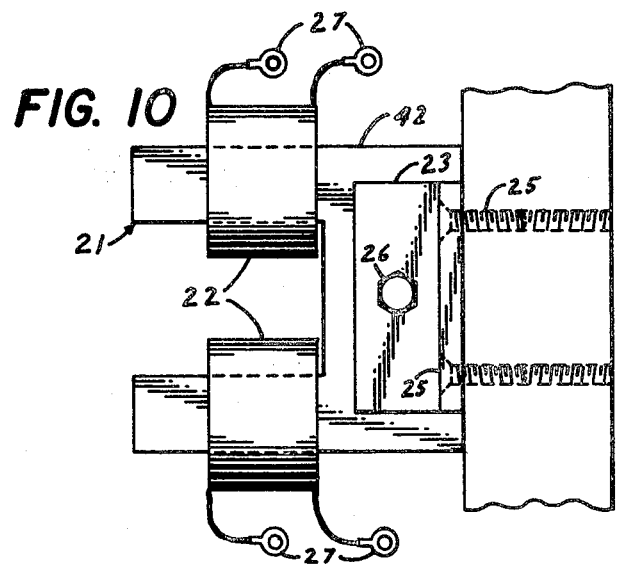

FIG. 5 is a cross sectional view taken on line 5—5 of FIG. 1, showing the face of a rotor with the magnet locating cover in place and indicating a typical arrangement of permanent magnets to be used for high frequency power generation (The relationship of field magnets to stator coils is made apparent in this figure. With reference to rotor detail as reflected in FIG. 5, the magnet arrangement should not be construed as limiting the scope of the rotor design as it falls within the realm of the invention.);

FIG. 6 is a face view of an alternative rotor to that shown in FIGS. 1 and 5 in which electromagnets have been substituted for the permanent magnets previously indicated, the magnet locating cover is shown in place, and in the broken areas, the field coil assemblies, are shown as viewed from their pole faces (Again, the magnet arrangement shown should not be construed as limiting the scope of the invention.);

FIG. 7 is a sectional view taken on line 7—7 of FIG. 6 showing and indicating the rotor body, coil assemblies, retaining devices and brush rings;

FIG. 8 is a further sectional view taken on line 8—8 of FIG. 6 showing the terminal posts for the distribution of energy to the field coil terminals;

FIG. 9 shows a field coil assembly as viewed from the pole faces and indicates securing devices and coil terminals; and FIG. 10 is a side elevational view of FIG. 9 and shows further details of the field coil assembly.

Referring to the drawings and to FIG. 1 in particular, it will be noted that the end of casing segment 1 is prepared to receive an end plate 3. In the event that an alternator/generator of a particular output requires only one rotor 6, end plate 4 would be substituted for intermediate stator support plate 5.

An assembly consisting of casing 1, end plates 3 and 4, when complete with bearings 10, suitably proportioned shaft 9 and appropriately dimensioned tie rods 11 would define the structural confines of a single rotor alternator/generator.

FIG. 1 also shows the following: stator "coil-pole" assemblies 8, permanent magnet assemblies 7, permanent magnet locating and retaining cover 12, permanent magnet locating and retaining cover securing screws 36, and rotor-bearing locating sleeves 37, 38 and 39. Bearing locating sleeves would be of suitable longitudinal dimension to allow for interchanging of end and intermediate stator support plates. Further indicated in FIG. 1 are casing segments 2.

A further study of FIG. 1 will show how the alternator/generator output capacity may be increased by simple addition of intermediate stators and rotors when accompanied by increase in shaft and tie rod lengths. It should be noted that while FIG. 1 indicates field energy in the rotor as being furnished by permanent magnets, the substitution of an electromagnet type rotor as further detailed in the disclosure may be readily effected.

A further modification to the details as indicated in FIG. 1 contemplates the omission of locating sleeves 37, 38 and 39 and the substitution of split-sleeve type bearings for those indicated. This modification together with suitably sized removeable covers located on the casing segments 1 and 2 would facilitate replacement or maintainance of unit components.

In FIG. 2 a representative arrangement of stator coil assemblies 8 is indicated and disposed about the face of a support plate 5. It would appear evident that this is not representative of a finite quantity or arrangement of coils which could be disposed on a multiplicity of pitch circles and in a great variance of quantities and angular orientation as indicated by design conditions. This flexibility of design scope is a benefit explained elsewhere herein.

In FIG. 3 a detail of a stator "coil-pole" assembly 8 is shown. The three-toothed laminated pole piece 17 is in evidence as is the output coil 19, coil terminals 18, pole retainers 13 and 14, pole retainer screws 15, and pole securing bolt 16.

FIG. 4 is an elevational view of FIG. 3 and provides greater clarity of detail.

FIG. 5 is a sectional view showing a permanent magnet type rotor face, and the relationship of the permanent magnets 7 to the stator coil assemblies 8 shown in FIG. 2 is in evidence. Pitch circles at permanent magnet centers are in coincidence with pitch circles of the coil assemblies.

It will be noted that there are three permanent magnet stacks per coil shown in FIG. 5, this number being coincident with the number of teeth on each coil assembly.

It is assumed that the polarity at the permanent magnet faces is alternately north and south, this being one arrangement considered to achieve flux linkage in order to produce lines of force in the magnetic circuit.

While the drawings indicate the permanent magnet on either face of the rotor as being in radial alignment, this is not necessarily a feature of the invention and staggered orientations are also possible.

In further reference to the permanent magnets, it is not an essential of the invention that they be restricted to the size, shape or quantities indicated, since other variations fall within the scope of the invention.

In further consideration of FIG. 5, the permanent magnet locating and retaining cover 12 is shown in location as are its securing screws 36. Also indicated in FIG. 5 is the location of tie rods 11 and a detail of the alternator/generator feet which are an integral part of end plates 3 and 4.

In FIG. 6 a rotor 20 equipped with electromagnetic field coil assemblies 21 is indicated. Again, the arrangements of the magnets is general, and do not restrict the scope of the invention. Also shown in FIG. 6 at the rotor face are two field coil input transfer rings 29 and 30 by which direct current from a convenient source is relayed from brushes (not shown) to the field coils 22. Terminal posts 32, to which the individual field coil terminals 27 connect, are also shown. It will be noted that the peripheral rim of the rotor incorporates lobes 41 designed to create an area of low pressure at their trailing edges in order to draw cooling air through slots 40 as indicated in the broken area at the rotor rim. As in FIG. 5, the relationship of field magnets to stator coils is in evidence.

In FIG. 7, which is a sectional view of FIG. 6, greater structural detail of the rotor 20 is indicated. Details provided include the means whereby field coil assembly locating and retaining cover 35 is secured to the rotor body by securing screws 28. Also shown are threaded holes for set screws whereby the rotor hub 43 may be secured to the alternator/generator shaft 9.

In FIG. 8, field coil input transfer rings 29 and 30 are indicated as being cemented in insulated grooves on one face of the rotor 20. Terminals 31 lead the field coil input energy from the rings 29 and 30 to terminal posts 32 which are insulated from the rotor body by insulating washers 33 and insulating sleeves 34.

FIG. 9 shows details of field coil assembly 21 comprising field coils 22, field coil pole piece 42, pole piece retainers 23 and 24, as well as retainer securing screws 25. Also shown is pole securing bolt 26 and field coil terminals 27. It should be noted that the laminated pole pieces 42 are curved to coincide with the stator pole pitch circle.

FIG. 10 is an elevational view of FIG. 9, presented in the interest of clarity and shows greater detail of the means for securing the field coil assembly 21 to the rotor 20.

A rotor 6, of disc or flywheel configuration, as indicated in the drawings, suitably affixed at its hub to a shaft 9, supported in bearings 10, is rotated by a driver (not shown) such as a reciprocating engine or turbine.

In one mode of function (delineated as Option #1), a series or plurality of permanent magnets 7 arranged about the face or faces of the rotor 6 and suitably secured thereto are made to revolve in such manner that their orbital paths are in coincidence with a series or plurality of tooth-shaped pole pieces 17 of magnetic material about which, in a manner as detailed in the drawing, an induction coil 19 of conducting material is affixed.

The magnetic pole pieces 17, together with the conducting coils 19, are rigidly secured to a stationary structure (the stator plate 5) and arranged on pitch circles coincident with the pitch circles on which the rotor field magnets 7 are arranged.

To those experienced in the art, and when considered with the details provided in these drawings, it is obvious that the cooperation between the field magnets 7 (particularly when arranged in alternate polarities) and the stator poles 17 would result in the production of electrical energy due to the cutting of the lines of magnetic flux produced in the magnetic circuit.

It is also apparent that electrical energy produced by the individual coils 19 could be led to bus bars (not shown) or other external conductors in a great variety of voltages and capacities dependant upon the number of coils employed and/or the manner of the wiring arrangements such as connecting the coil terminals in parallel or in series, or in combinations thereof.

External switching apparatus connecting to alternator/generator terminals could also be employed to effect changes of voltages and output capacities while the alternator/generator is operating under "on line" conditions.

By variations in field magnet polarity, arrangement and number of field magnets employed, a wide range of frequencies can be obtained from a single alternator/generator.

By unipolar arrangement of field magnets, pulsating direct current could be produced from single or multiple stator arrangements, and if required, simultaneously from a single unit together with alternating type current.

In considering the overall concept as set forth herein, it would also be apparent that an alternator/generator could be produced with bearings provided at intermediate support plates, and that adequate openings provided along the length of a unit would allow for testing and replacement of individual components without disassembly of the unit.

Moreover, the flexibility allowed by the unique stator-rotor concept makes it possible to construct units of greatly varying diameters, lengths and outputs while employing standardized, mass-produced active components. Additionally, the ease with which unit diameters may be varied at design level allows for a wide range of driver speeds including very low speeds with the attendant advantages of extended unit life expectancy.

In the second mode of function (delineated as Option #2), a rotor 20 employing electromagnets 21, rather than the permanent magnets as used in Option 190 1, is substituted.

Direct current electricity to energize the electromagnets 21 is led from a convenient source to brushes affixed to an axially oriented arm extending toward the rotor from the stator support plates. Electrical energy from the brushes is transferred to the field coils 22 through the medium of the brush rings 29 and 30 shown in the drawings.

In all other respects, the function of the invention conforms to Option #1 except that Option #2 offers even greater flexibility, since field strength may be varied for even greater control and variety of output conditions.

Having made the disclosure as set forth herein, including certain mechanical arrangements as shown in the drawings, which are merely indicative of certain approaches contemplated by my invention, and being aware of the many modifications possible in an operating unit and the many modifications likely to appear to those skilled in the art, it is accordingly stated that my invention is not limited to the embodiments illustrated and described herein, but further includes all modifications and variations as may fall within the scope of the following claims.

What is claimed is:

1. An alternator/generator of modular construction, comprising:
    (a) a plurality of stator plates located in spaced-apart parallel planes, each stator plate carrying a series of pole pieces having fingers, said fingers carrying electrical output coils,
    (b) a rotor disc located between, and parallel to, each two successive stator plates, each rotor disc carrying a series of field magnets cooperable with said output coils carried by adjacent stator plates, the number of said field magnets on each face of a rotor disc being equal to the number of said pole piece fingers on an opposite face of an adjacent stator plate, and each of the field magnets carried on each face of said rotor disc being aligned in the axial direction of said shaft with one of said pole piece fingers on an opposite face of an adjacent stator plate when said rotor disc is in a stationary position,
    (c) a rotatable shaft carrying all said rotor discs, said shaft passing through said stator plates,
    (d) bearing means carried by the two endmost stator plates and by at least some of said stator plates between the endmost plates, said shaft being rotatably supported by said bearing means,
    (e) a plurality of individual casing sections, one of said casing sections being between each two successive stator plates, and
    (f) means for securing said casing sections and stator plates together to define a housing enclosing all the rotor discs.

2. An alternator/generator of modular construction, comprising:
    (a) a plurality of stator plates located in spaced-apart parallel planes, each stator plate carrying a series of electrical output coils, each output coil being part of an assembly including a pole piece of magnetic material fixed to its respective stator plate, the cross-sectional area of each pole piece being smaller than the cross-sectional area of each field magnet,
    (b) a rotor disc located between, and parallel to, each two successive stator plates, each rotor disc carrying a series of field magnets cooperable with said output coils carried by adjacent stator plates,
    (c) a rotatable shaft carrying all said rotor discs, said shaft passing through said stator plates,
    (d) bearing means carried by the two endmost stator plates and by at least some of said stator plates between the endmost plates, said shaft being rotatably supported by said bearing means,
    (e) a plurality of individual casing sections, one of said casing sections being between each two successive stator plates, and
    (f) means for securing said casing sections and stator plates together to define a housing enclosing all the rotor discs.

3. An alternator/generator as defined in claim 2 wherein each pole piece includes a plurality of teeth, said output coil surrounding at least one of said teeth, and wherein a field magnet is axially aligned with each tooth.

4. An alternator/generator as defined in claim 2 wherein said pole pieces are fixed to their respective stator plates in a circular pattern, each pole piece being curved to conform to the radius of curvature of said circular pattern.

5. An alternator/generator of modular construction, comprising:
    (a) a plurality of stator plates located in spaced-apart parallel planes, each stator plate carrying a series of electrical output coils.
    (b) a rotor disc located between, and parallel to, each two successive stator plates, each rotor disc carrying a series of field magnets cooperable with said output coils carried by adjacent stator plates,
    (c) lobes on the periphery of each rotor disc for creating a low pressure region at one end of each lobe, and a slot at the low pressure region through which air flows radially inwardly to cool said field magnets,
    (d) a rotatable shaft carrying all said rotor discs, said shaft passing through said stator plates,
    (e) bearing means carried by the two endmost stator plates and by at least some of said stator plates between the endmost plates, said shaft being rotatably supported by said bearing means,
    (f) a plurality of individual casing sections, one of said casing sections being between each two successive stator plates, and
    (g) means for securing said casing sections and stator plates together to define a housing enclosing all the rotor discs.

6. An alternator/generator as defined in claim 5 wherein each of said lobes has the shape of the upper half of an airfoil.

* * * * *